(12) United States Patent
Swift et al.

(10) Patent No.: US 8,721,283 B2
(45) Date of Patent: May 13, 2014

(54) PITCH CHANGE APPARATUS

(75) Inventors: Andrew Swift, Uttoxeter (GB); Antony Morgan, Wolverhampton (GB)

(73) Assignee: Rolls-Royce PLC, London (GB)

( * ) Notice: Subject to any disclaimer, the term of this patent is extended or adjusted under 35 U.S.C. 154(b) by 741 days.

(21) Appl. No.: 12/954,744

(22) Filed: Nov. 26, 2010

(65) Prior Publication Data

US 2011/0164998 A1 Jul. 7, 2011

(30) Foreign Application Priority Data

Jan. 7, 2010 (GB) .................................... 1000144.4

(51) Int. Cl.
*F01D 7/00* (2006.01)

(52) U.S. Cl.
USPC .............................................. 416/42; 415/26

(58) Field of Classification Search
CPC ....... B64C 11/42; F01D 7/00; F05D 2260/70; B63H 2003/088
USPC .......... 415/26, 148, 122.1; 416/42, 31, 198 A
See application file for complete search history.

(56) References Cited

U.S. PATENT DOCUMENTS

| | | | | |
|---|---|---|---|---|
| 2,619,182 A | * | 11/1952 | Martin | 416/34 |
| 2,857,007 A | * | 10/1958 | Detamore et al. | 416/34 |
| 2,869,650 A | * | 1/1959 | Fairhurst et al. | 416/46 |
| 3,067,825 A | * | 12/1962 | Chilman et al. | 416/154 |
| 4,934,901 A | * | 6/1990 | Duchesneau | 416/46 |
| 6,261,062 B1 | | 7/2001 | Amerling et al. | |

FOREIGN PATENT DOCUMENTS

| | | |
|---|---|---|
| EP | 1 832 509 A3 | 9/2007 |
| EP | 1 881 176 A2 | 1/2008 |
| GB | 1 517 167 | 7/1978 |
| GB | 2 347 974 A | 9/2000 |

OTHER PUBLICATIONS

British Search Report issued in British Application No. GB1000144.4 on May 4, 2010.

* cited by examiner

*Primary Examiner* — Edward Look
*Assistant Examiner* — Liam McDowell
(74) *Attorney, Agent, or Firm* — Oliff PLC

(57) ABSTRACT

A pitch change apparatus comprises a hydraulic actuator for angular displacement of propellers of the propeller assembly. The hydraulic actuator has a piston and cylinder arrangement which defines fine and coarse fluid chambers. Increasing the volume of the fine chamber at the expense of the coarse chamber results in angular displacement of the propellers to a finer pitch. Increasing the volume of the coarse chamber at the expense of the fine chamber results in angular displacement of the propellers to a coarser pitch. The pitch change apparatus further comprises one or more fine hydraulic lines carrying hydraulic fluid to and from the fine chamber, and a coarse hydraulic line carrying hydraulic fluid to and from the coarse chamber. The apparatus further comprises a pressure-sensing check valve which fluidly isolates the coarse chamber from the coarse hydraulic line if the pressure in the coarse hydraulic line falls below a threshold pressure.

11 Claims, 3 Drawing Sheets

PITCH CHANGE APPARATUS

BACKGROUND

The present invention relates to a pitch change apparatus for a propeller assembly having a row of propeller blades which rotate around an axis of the assembly.

Aero propellers, either single rotor or contra-rotating, usually have a means of varying the blade pitch via a pitch control mechanism (PCM). Blade so pitch variation can optimise efficiency of thrust delivery whilst reducing noise throughout the flight envelope and provide reverse thrust. Further, by feathering of the blades, drag and rotor speed can be controlled in some failure cases. In particular, relative to a fine pitched propeller blade, a coarse pitched blade generally provides greater rotational resistance (which lowers engine RPMs) and is provides less forward velocity drag resistance.

There are a number of established ways of configuring a PCM, but generally they all feature: a source of power, a prime mover, a mechanism from prime mover to blade, and a failsafe system.

In the event of PCM failure, it may be desirable to move the blades to coarse to prevent dangerous increases in engine speed. In the event of engine failure, it may be likewise be desirable to move the blades to coarse to reduce aircraft gliding resistance. However, the combined effect of rotational and aerodynamic forces acting on the blades tends to urge the blades to fine. Thus PCMs usually have a failsafe arrangement for preventing undesirable pitch variation in the event of power loss failure.

FIG. 1 shows schematically a longitudinal cross-section through a prior art apparatus for varying the pitch of a row of propeller blades of a propeller assembly. The apparatus comprises a hydraulic cylinder 1 and piston 2 which extend along the rotational axis X of the propeller blades 3 (only one of the propeller blades being shown in FIG. 1). The cylinder contains hydraulic fluid (e.g. oil), and a wall 4 fluidly seals the end of the cylinder. The piston divides the cylinder into two chambers 5, 6. By varying the fluid pressure difference between the two chambers, the piston can be moved to the left or the right along the axis X.

A quill 7 extends radially inwardly from the inboard end of each propeller blade 3 along the rotational axis Y of the blade, the quill connecting to an end of a crank arm 8 which has its other end in a respective retaining recess 9 formed at the end of the piston 2. By this mechanism, movement of the piston along the rotational axis X is converted into pitch-changing rotation of the blade about rotational axis Y.

The cylinder 1 is part of a larger housing which also provides a fixing arrangement 10 for the propeller blades 3 and a rotation drive input 11 for turning the propeller assembly. The drive input is typically connected to the output shaft of an engine gearbox. Hydraulic fluid for the chambers 5, 6 is provided by a fluid transmission tube 12 which extends axially from the drive input. A rotating fluid coupling 13 at the end of the tube allows fluid to be is transmitted between the static and rotating fields.

A ball screw 14 (i.e. a screw with a plurality of balls located in the thread of the screw) extends along the rotational axis X, an end of the ball screw 14 being fixed by a hydraulically signalled brake 15 to the wall of the cylinder 1. A nut 16 which is axially and rotationally fixed relative to the piston 2 is threadingly engaged to balls of the ball screw. Lubricated in the hydraulic fluid, the balls provide a low friction threaded connection between the screw and the nut and offer little resistance to the axial movement of the piston in the cylinder whilst the pressurised de-activated brake allows the screw to rotate. However, in the event of fluid pressure loss, the brake activates and increases the frictional resistance to rotational movement of the screw, which restrains movement of the nut and piston and thereby prevents changes to the pitch of the propeller blades 3 in the fine direction.

Screw pitch lock apparatuses, such as the one shown in FIG. 1, require the propeller assembly to have a central zone along its rotational axis for installation of the apparatus. Generally, such a zone is available on single propeller engines where the propeller assembly is mounted to one side of the engine's drive gearbox. However, other engine arrangements, and particularly in-line arrangements, may not have this zone available. For example, EP A 1881176 describes a contra-rotating propeller engine with a pair of propeller blade assemblies which rotate in opposite directions as a result of association with a coaxial epicyclic gear assembly acting as a differential gearbox. The propeller assemblies are in the "pusher" configuration, with the free power turbine drive shaft, static support structure for the propeller assembly rotors and the gearbox occupying central space on the axis of the forward propeller assembly, and thereby rendering a centrally-located ball screw style pitch lock apparatus impractical for at least the forward propeller assembly.

Likewise, a centrally-located ball screw style pitch lock system would be impractical for the rear propeller assembly of a propeller engine with a pair of contra-rotating "puller" propeller blade assemblies driven by an in-line gear assembly.

A further difficulty with a contra-rotating propeller system is that lines supplying hydraulic fluid to a PCM may be subject to a complex route through the contra-rotating drive system. This potentially introduces more failure mode threats than single propeller systems, which can make use of an offset gearbox.

SUMMARY

Accordingly, an aim of the present invention is to provide a pitch change apparatus with enhanced pitch lock capability for a propeller assembly.

A first aspect of the present invention provides a pitch change apparatus for a propeller assembly having a row of propeller blades which rotate around an axis of the assembly, the apparatus comprising:

a hydraulic actuator for angular displacement of propellers of the propeller assembly, the hydraulic actuator having a piston and cylinder arrangement which defines fine and coarse fluid chambers, whereby increasing the volume of the fine chamber at the expense of the coarse chamber results in angular displacement of the propellers to a finer pitch, and increasing the volume of the coarse chamber at the expense of the fine chamber results in angular displacement of the propellers to a coarser pitch, one or more fine hydraulic lines carrying hydraulic fluid to and from the fine chamber, and a coarse hydraulic line carrying hydraulic fluid to and from the coarse chamber;

wherein the apparatus further comprises a pressure-sensing check valve which fluidly isolates the coarse chamber from the coarse hydraulic line if the pressure in the coarse hydraulic line falls below a threshold pressure.

Thus the check valve provides a safeguard against loss of pressure in the coarse hydraulic line as the fluidly isolated coarse chamber resists having its volume reduced. That is, angular displacement of the propellers to a finer pitch can be prevented because an increase in the volume of the fine chamber at the expense of the coarse chamber is resisted. This safeguard may be in addition to a separate pitch lock arrangement (e.g. based on ball screws or other similar devices) for the pitch change apparatus. Advantageously, the check valve can react quickly and automatically to loss of pressure in the coarse hydraulic line.

The pitch change apparatus may have any one, or to the extent that they are compatible, any combination of the following optional features.

Typically, the pitch change apparatus further has a unison ring which is coaxial with the propeller assembly, the unison ring being movable by the hydraulic actuator to drive mechanisms (e.g. quill and cam, lever or crank arrangements) for angular displacement of respective propellers.

Advantageously, the unison ring can be installed coaxially to the propeller assembly, but not in the central zone along its rotational axis. Likewise, the hydraulic actuator and the check valve can be positioned away from the central zone. Thus the apparatus can be used to control the pitch of the forward propeller assembly of a propeller engine with a pair of contra-rotating "pusher" propeller blade assemblies driven by an in-line gear assembly, or the rear propeller assembly of a propeller engine with a pair of contra-rotating "puller" propeller blade assemblies driven by an in-line gear assembly.

Typically, the hydraulic actuator and the check valve rotate with the propeller assembly, Preferably, the check valve has:

a valve body which is movable between an open position in which the coarse hydraulic line can carry hydraulic fluid to and from the coarse chamber, and a closed position in which the coarse chamber is fluidly isolated from the coarse hydraulic line, the valve body being biased towards the closed position, and a pilot piston and cylinder which define a pilot chamber in fluid communication with the coarse hydraulic line, the pilot piston being movable to counteract the bias on the valve body and thereby move the valve body to the open position when the pressure in the pilot chamber is at or above the threshold pressure. This arrangement can provide a relatively simple and reliable check valve. The valve body may be spring biased towards the closed position.

Preferably, the pilot chamber is located at one side of the pilot piston, and the pilot cylinder has a leakage line extending from the opposing side of the pilot piston to provide a pressure difference across the pilot piston when the pilot chamber is at or above the threshold pressure. The pressure difference thus allows the pilot piston to counteract the bias on the valve body.

A second aspect of the invention provides a propeller assembly having a pitch change apparatus according to the first aspect. The pitch change apparatus may have any one, or to the extent that they are compatible, any combination of the optional features of the first aspect.

A third aspect of the invention provides an engine arrangement having:

a first propeller assembly having a pitch change apparatus according to the first aspect, a gear assembly that drives the first propeller assembly, and a power drive shaft that connects to the gear assembly at a side thereof to drive the gear assembly;

wherein the first propeller assembly is coaxial with the power drive shaft. The pitch change apparatus may have any one, or to the extent that they are compatible, any combination of the optional features of the first aspect.

Typically the power drive shaft extends axially from a power turbine section of a gas turbine engine to drive the gear assembly.

The engine arrangement may be for a contra-rotating engine, the arrangement further having:

a second propeller assembly coaxial with the power drive shaft and arranged to rotate in an opposite direction to the first propeller assembly, the gear assembly also driving the second propeller assembly, wherein the second propeller assembly has a pitch change apparatus according to the first aspect.

A fourth aspect of the invention provides a gas turbine engine having an engine arrangement according to the third aspect, the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially from the power turbine section to drive the gear assembly.

BRIEF DESCRIPTION OF THE SEVERAL VIEWS OF THE DRAWINGS

Embodiments of the invention will now be described by way of example with reference to the accompanying drawings in which.

DETAILED DESCRIPTION

Figure 1:
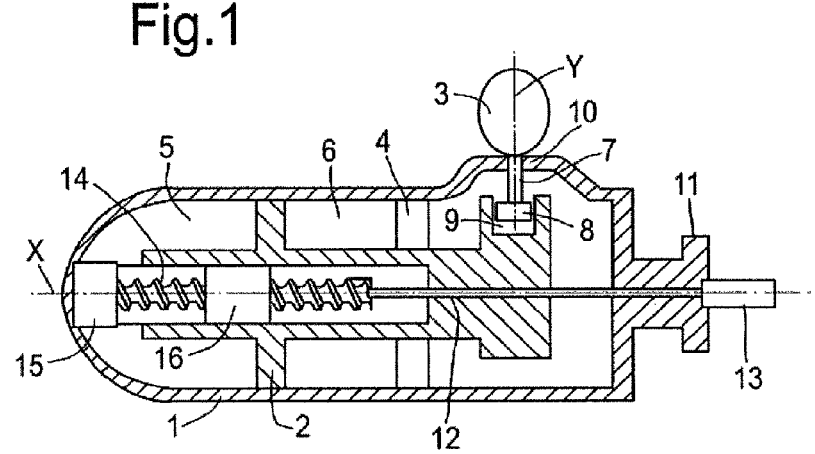
FIG. 1 shows schematically a longitudinal cross-section through a prior is art apparatus for varying the pitch of a row of propeller blades of a propeller assembly.
Figure 2:
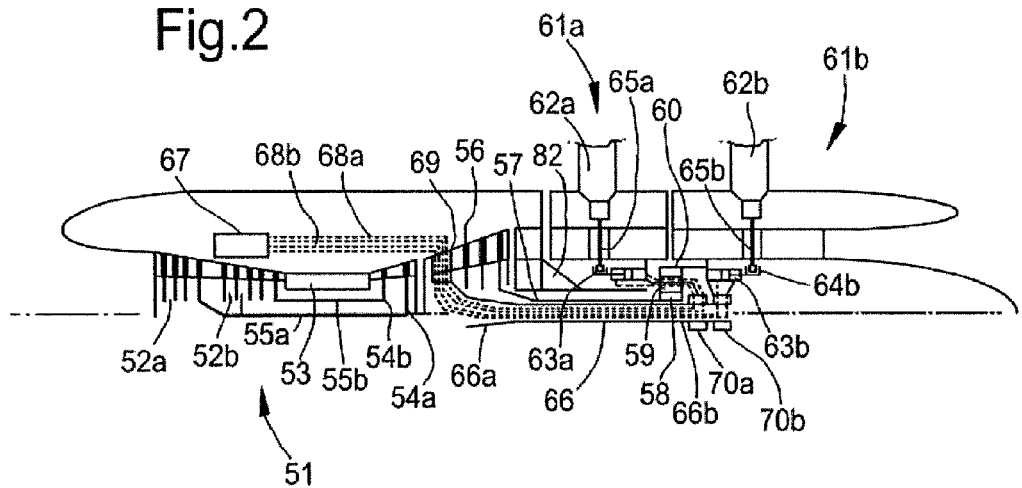
FIG. 2 shows a schematic longitudinal cross-section through a pusher style, contra-rotating propeller, turboprop engine with an in-line shaft configuration.

A schematic longitudinal cross-section through a pusher style, contra-rotating propeller, turboprop engine is shown in FIG. 2. The engine has a generator section 51 comprising in flow series low pressure 52*a* and high pressure 52*b* compressor subsections, a combustor subsection 53, and high pressure 54*b* and low pressure 54*a* turbine subsections. Generator drive shafts 55*a*, 55*b* connect the respective compressor and turbine subsections. Downstream of the generator section is a free power turbine 56 which drives a rearwardly extending power drive shaft 57.

The distal end of the power drive shaft 57 drives a sun gear 58 of an epicyclic gear assembly which is coaxial with the power drive shaft. The sun gear drives planetary gears 59, which in turn drive a carrier (not shown) and a ring gear 60. The carrier and ring gear rotate in opposite directions. The carrier drives a first propeller assembly 61*a* on the upstream side of the gear assembly, while the ring gear drives a contra-rotating second propeller assembly 61*b* on the downstream side of the gear assembly. Each propeller assembly has a row of propeller blades 62*a*, 62*b*, with each blade being rotatable about its longitudinal axis to vary the blade pitch. The pitch variation for each propeller assembly is achieved by a respective hydraulic actuator 63*a*, 63*b* which moves a corresponding unison ring 64*a*, 64*b* in the axial direction of the engine. The axial movement of the unison rings rotates the blades via a quill shaft and lever or cam follower arrangement 65*a*, 65*b* which extends from the base of each blade.

The power drive shaft 57 is hollow and a static conduit or central oil tube (COT) 66 extends along the internal cavity formed by the shaft. One end of the COT opens to a mouth 66a at the gap formed between the forward end of the power drive shaft and the rearward end of the low pressure generator drive shaft 55a. The other end of the COT penetrates through the centre of the sun gear 58 to form a projection 66b on the downstream side of the gear assembly. A hydraulic pressure power source 67 (comprising e.g. a hydraulic pump, valves and control unit) for actuating the actuators 63a, 63b is attached to an accessory gearbox (not shown) of the engine remote from the actuators 63a, 63b. The hydraulic fluid is typically filtered engine oil.

To transfer hydraulic fluid between the power source 67 and the actuators 63a, 63b, respective fluid supply lines 68a, 68b are routed from the source to the mouth 66a of the COT 66. The supply lines traverse the working gas annulus of the engine through a row of nozzle guide vanes 69 which are located between the generator section 51 and the free power turbine 56. This arrangement protects the supply lines from the high temperatures of the working gas. From the mouth of the COT, the supply lines are routed along the COT's internal cavity to arrive at the projection 66b on the downstream side of the gear assembly. A pair of axially spaced hydraulic rotating couplings 70a, 70b are mounted to the projection, the upstream one associated with the hydraulic actuator 63a of the first propeller assembly 61a and the downstream one associated with the hydraulic actuator 63b of the second propeller assembly 61b. The internal sides of the couplings are formed by static fluid distributors while the external side of the upstream coupling 70a has a rotating sleeve that is driven by a drive bracket from the first propeller assembly 61a and the external side of the downstream coupling 70b has a rotating sleeve that is contra-driven by a drive bracket from the second propeller assembly 61b. Fluid is transmitted across upstream coupling 70a for those supply lines 68a which are routed to the hydraulic actuator 63a of the first propeller assembly, while fluid is transmitted across downstream coupling 70b for the remaining supply lines 68b which are routed to the hydraulic actuator 63b of the second propeller assembly.

The route taken by the supply lines 68b from the downstream coupling 70b to the hydraulic actuator 63b of the second propeller assembly 61b can be relatively direct. In contrast, the route taken by the supply lines 68a from the upstream coupling 70a to the hydraulic actuator 63a of the first propeller assembly 61a is more complicated as it passes through the gear assembly. Conveniently, the supply lines 68a are routed through the planetary gears 59 and carrier, which rotate with the first propeller assembly.

The engine arrangement overcomes problems with conventional propeller PCMs, particularly when applied to a pusher style contra-rotating open rotor with an in-line differential power gearbox. In particular, the arrangement of the COT 66 and the hydraulic rotating couplings 70a, 70b mounted to the COT projection 66b allows small diameter couplings to be used and hence low PV values and low leakage rates can be achieved. Further the stiffness of the gear assembly is not substantially compromised by the COT extending through the sun gear 58.

Also the potential for axial jamming of the transfer rods (used in EP A 1881176) and a consequent inability to feather the propeller blades to control drag and rotor speed is avoided.

The COT can also be used to route other power lines or control lines through the engine, these lines being e.g. hydraulic or electrical.

Figure 3:
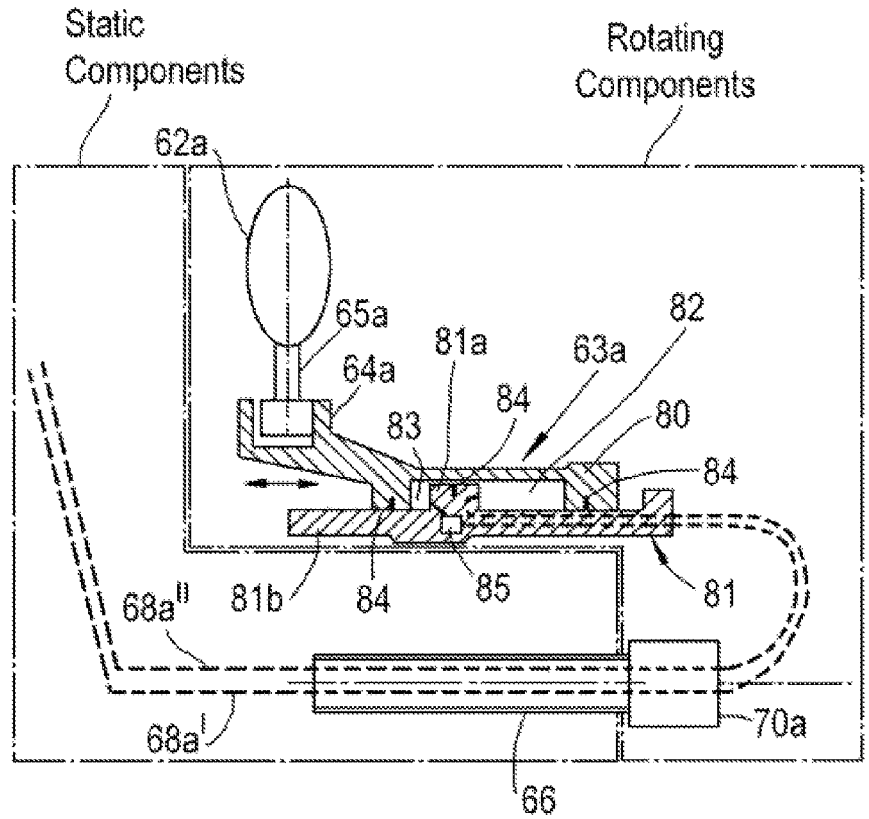
FIG. 3 shows schematically a pitch change apparatus used with the first propeller assembly of the engine of FIG. 2.

FIG. 3 shows schematically a pitch change apparatus used with the first propeller assembly 61a of the engine of FIG. 2. A similar pitch change apparatus can be used with the second propeller assembly 61b of the engine of FIG. 2. Features common to FIGS. 2 and 3 share the same reference numbers. The dot-dashed outlines divide components between those that are statically mounted and those that rotate with the first propeller assembly.

The pitch change apparatus comprises the first hydraulic actuator 63a and to the unison ring 64a. The first hydraulic actuator comprises a cylinder 80 and a piston 81. The cylinder is integral with and moves axially with the unison ring, as indicated by the doubled-headed arrow, to angularly displace the propellers 62a. Together the cylinder and the piston define fine 82 and coarse 83 chambers, the piston 81 having a dividing wall portion 81a which separates the two chambers. Increasing the volume of the fine chamber (by sliding the cylinder to the right) moves the propellers to a finer pitch, while increasing the volume of the coarse chamber (by sliding the cylinder to the left) moves the propellers to a coarser pitch. Seals 84 fluidly seal the ends of the chambers. The piston also has a body portion 81b which defines the radially inner side of the chambers and from which the dividing wall portion projects radially outwardly. The body portion carries a pressure-sensing check valve 85 and also provides a route for a fine fluid supply line 68a' to communicate with the fine chamber, and for a coarse fluid supply line 68a" to communicate with the coarse chamber.

Figure 4:
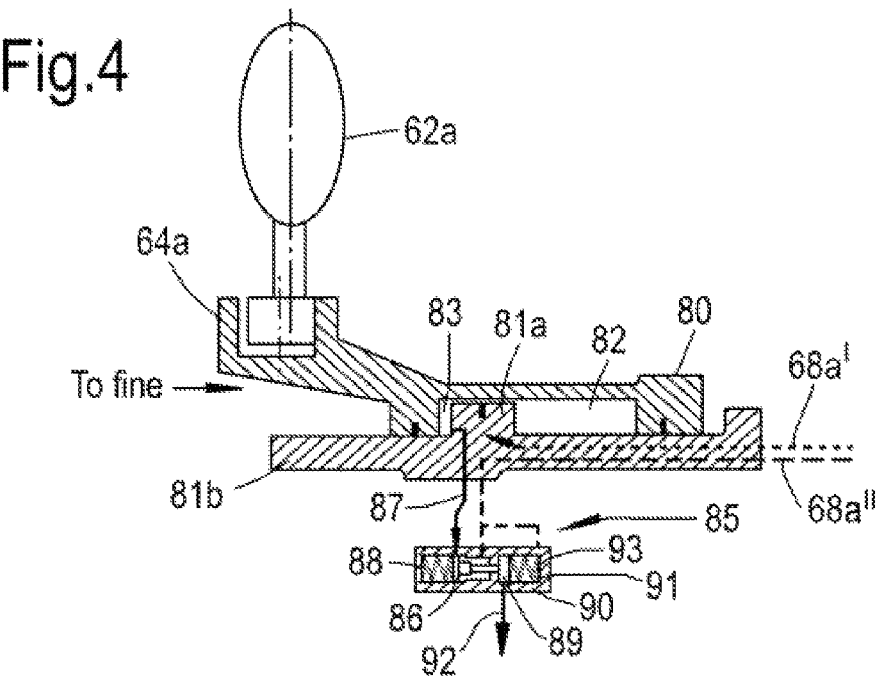
FIG. 4 shows schematically the pitch change apparatus of FIG. 3 with blade movement to a finer pitch.
Figure 5:
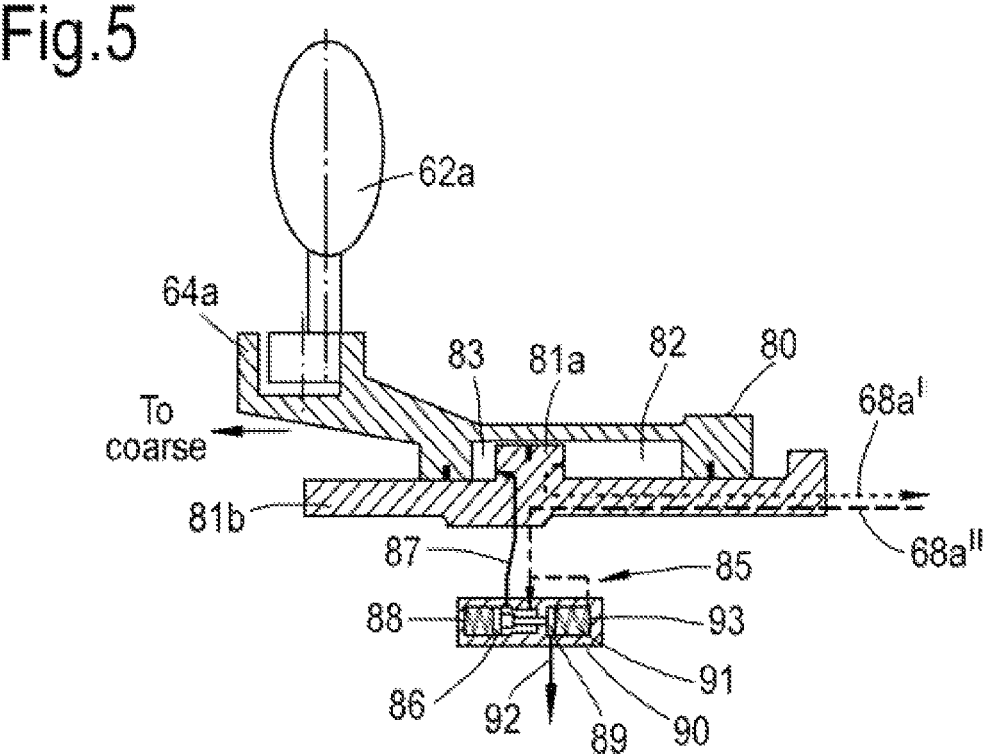
FIG. 5 shows schematically the pitch change apparatus of FIG. 3 with blade movement to a coarser pitch.
Figure 6:
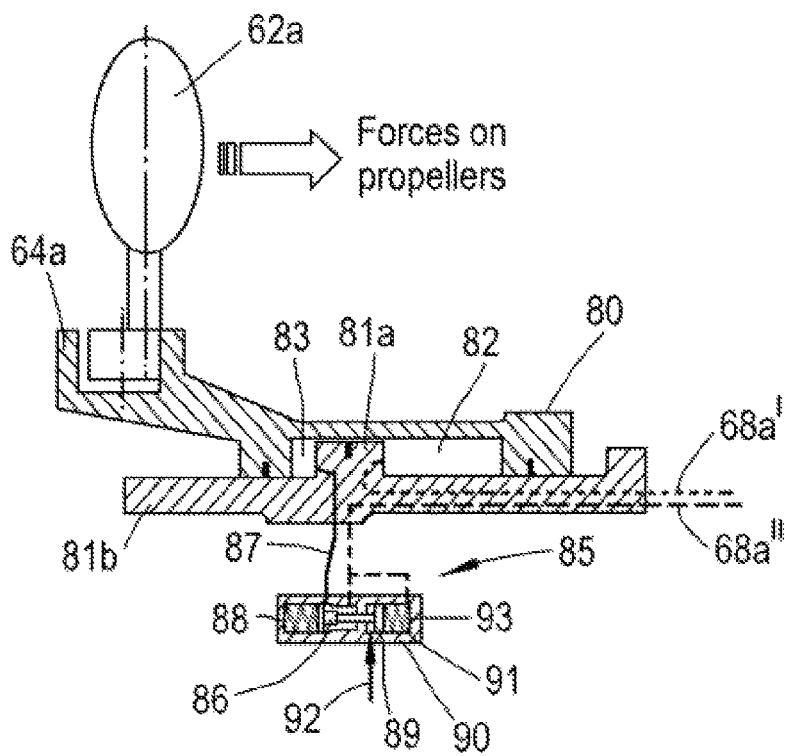
FIG. 6 shows schematically the pitch change apparatus of FIG. 3 resisting blade movement to a finer pitch when the pressure in the coarse hydraulic line is below threshold.

The configuration and operation of the check valve 85 are illustrated in more detail in FIGS. 4 to 6, FIG. 4 showing schematically the pitch change apparatus with blade movement to a finer pitch, FIG. 5 showing schematically the pitch change apparatus with blade movement to a coarser pitch, and FIG. 6 showing schematically the pitch change apparatus resisting blade movement to a finer pitch when the pressure in the coarse hydraulic line is below threshold. In each of FIGS. 4 to 6, for clarity, the check valve is shown enlarged and outside the body portion 81b of the piston 81.

The check valve 85 comprises a valve body 86, which, in the plane of FIGS. 4 to 6, can move from left to right, movement to the left unseating the valve and providing an open position and movement to the right seating the valve and providing a closed position. The coarse fluid supply line 68a" joins the check valve to the right of the valve body, and a further short fluid line 87 extends from the left of the valve body to the coarse chamber 83. In the open position, fluid can flow between the coarse fluid supply line and the further fluid line. In the closed position, such flow is prevented. A main spring 88 biases the valve body to the closed position.

The check valve 85 also comprises a pilot piston 89 and pilot cylinder 90. The valve body 86 and the pilot piston are connected so that movement of the pilot piston can drive corresponding movement of the valve body. The pilot piston and pilot cylinder together define a pilot chamber 91 to one side of the pilot piston, the pilot chamber being in fluid communication with the coarse fluid supply line 68a". The pilot piston is not sealed against the wall of the pilot cylinder so as to provide a low operational friction. The other side of the pilot piston is fluidly connected via a leakage line 92 to e.g. the engine gear assembly to ensure a controlled and accurate pressure difference across the pilot piston. A further spring 93, acting on the pilot piston, counteracts to an extent the bias produced by main spring 88. The further spring allows the pilot piston and the valve body to be formed as two separate components held together by a compressive force connection even under worst-case friction forces and gearbox pressure. This separation into two components allows the valve body movement to be more tolerant of production process misalignments. When the pressure in the pilot chamber is such that the force on the piston produced by the pressure differential across the pilot piston in combination with the force of the further spring is greater than the opposing force of the main spring, then the valve body is moved to the open position. Conversely, when the pressure in the pilot chamber is such that the force on the piston produced by the pressure differential across the pilot piston in combination with the force of the further spring is less than the opposing force of the main spring, the valve body is moved to the closed position. The pressure in the pilot chamber at which the valve body moves between the open and closed positions thus equates to a threshold pressure in the coarse fluid supply line.

In FIG. 4, the pressure in the coarse fluid supply line 68a" is above the threshold pressure when the hydraulic fluid power source 67 commands angular displacement of the propellers 62a towards fine. Arrows on the fine 68a' and coarse fluid supply lines, the further fluid line 87, and the leakage line 92 indicate directions of fluid flow. The fine chamber 82 expands and the coarse chamber 83 shrinks, hydraulic fluid entering the fine chamber from the fine fluid supply line and exiting the coarse chamber via the further fluid line. As the valve body 86 is held in the open position, the exiting fluid can then pass through the check valve 85 and into the coarse fluid supply line.

In FIG. 5, the pressure in the coarse fluid supply line 68a" is above the threshold pressure when the hydraulic fluid power source 67 commands angular displacement of the propellers 62a towards coarse. The coarse chamber 83 expands and the fine chamber 82 shrinks, hydraulic fluid entering the coarse chamber from the further fluid line 87 and exiting the fine chamber through the fine fluid supply line 68a'. As the valve body 86 is held in the open position, the fluid for the coarse chamber can flow from the coarse fluid supply line, through the check valve 85, and into the further fluid line.

In FIG. 6, pressure in the coarse fluid supply line 68a" is lost, e.g. due to failure in the hydraulic fluid power source 67 or major leakage from the fine fluid supply line 68a' or the coarse fluid supply line. Rotational and aerodynamic forces urge the propellers 62a towards fine, as indicated by the block arrow. Such movement to fine, if allowed to happen, could lead to excessive engine speed and increased aircraft gliding resistance. However, as the pressure in the coarse fluid supply line is reduced to below the threshold pressure, the valve body 86 moves to the closed position, isolating the fluid in the coarse chamber 83 from the coarse fluid supply line. Thus, the cylinder 80 and the unison ring 64a are prevented from sliding to the right by the isolated fluid in the coarse chamber. In this way, a counterforce to the rotational and aerodynamic forces acting on the propellers is automatically exerted, maintaining the propellers at their pitch at the moment of the loss of pressure in the fluid supply lines.

Advantageously, the pitch change apparatus can provide:

A near instant prevention of displacement towards fine should a major hydraulic failure occur.

A system which can be readily tested on the ground.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references mentioned above are incorporated by reference.

The invention claimed is:

1. A pitch change apparatus for a propeller assembly having a row of propeller blades which rotate around an axis of the assembly, the apparatus comprising:
    a hydraulic actuator for angular displacement of propellers of the propeller assembly, the hydraulic actuator having a piston and cylinder arrangement which defines a fine fluid chamber and a coarse fluid chamber, whereby increasing a volume of the fine chamber at an expense of the coarse chamber results in angular displacement of the propellers to a finer pitch, and increasing a volume of the coarse chamber an expense of the fine chamber results in angular displacement of the propellers to a coarser pitch,
    one or more fine hydraulic lines carrying hydraulic fluid to and from the fine chamber, and
    a coarse hydraulic line carrying hydraulic fluid to and from the coarse chamber;
    wherein the apparatus further comprises a pressure-sensing check valve which fluidly isolates the coarse chamber from the coarse hydraulic line if the pressure in the coarse hydraulic line falls below a threshold pressure.

2. The pitch change apparatus according to claim 1, wherein the check valve has:
    a valve body which is movable between an open position in which the coarse hydraulic line can carry hydraulic fluid to and from the coarse chamber, and a closed position in which the coarse chamber is fluidly isolated from the coarse hydraulic line, the valve body being biased towards the closed position, and
    a pilot piston and a pilot cylinder which define a pilot chamber in fluid communication with the coarse hydraulic line, the pilot piston being movable to counteract the bias on the valve body and thereby move the valve body to the open position when the pressure in the pilot chamber is at or above the threshold pressure.

3. The pitch change apparatus according to claim 2, wherein the valve body is spring biased towards the closed position.

4. The pitch change apparatus according to claim 3, further having a unison ring which is coaxial with the propeller assembly, the unison ring being movable by the hydraulic actuator to drive mechanisms for angular displacement of respective propellers.

5. The pitch change apparatus according to claim 2, wherein the pilot chamber is located at one side of the pilot piston, and the pilot cylinder has a leakage line extending from the opposing side of the pilot piston to provide a pressure difference across the pilot piston when the pilot chamber is at or above the threshold pressure.

6. The pitch change apparatus according to claim 5, further having a unison ring which is coaxial with the propeller assembly, the unison ring being movable by the hydraulic actuator to drive mechanisms for angular displacement of respective propellers.

7. The pitch change apparatus according to claim 2, further having a unison ring which is coaxial with the propeller assembly, the unison ring being movable by the hydraulic actuator to drive mechanisms for angular displacement of respective propellers.

8. The pitch change apparatus according claim 1, further having a unison ring which is coaxial with the propeller assembly, the unison ring being movable by the hydraulic actuator to drive mechanisms for angular displacement of respective propellers.

9. A propeller assembly having the pitch change apparatus according to claim 1.

10. An engine arrangement having:
a first propeller assembly having the pitch change apparatus according to claim 1,
a gear assembly that drives the first propeller assembly, and
a power drive shaft that connects to the gear assembly at a side thereof to drive the gear assembly;
wherein the first propeller assembly is coaxial with the power drive shaft.

11. The engine arrangement according to claim 10 which is for a contra-rotating engine, the arrangement further having:
a second propeller assembly coaxial with the power drive shaft and arranged to rotate in an opposite direction to the first propeller assembly, the gear assembly also driving the second propeller assembly,
wherein the second propeller assembly has a pitch change apparatus comprising:
a hydraulic actuator for angular displacement of propellers of the propeller assembly, the hydraulic actuator having a piston and cylinder arrangement which defines a fine fluid chamber and a coarse fluid chamber, whereby increasing a volume of the fine chamber at an expense of the coarse chamber results in angular displacement of the propellers to a finer pitch, and increasing a volume of the coarse chamber at an expense of the fine chamber results in angular displacement of the propellers to a coarser pitch,
one or more fine hydraulic lines carrying hydraulic fluid to and from the fine chamber, and
a coarse hydraulic line carrying hydraulic fluid to and from the coarse chamber;
wherein the apparatus further comprises a pressure-sensing check valve which fluidly isolates the coarse chamber from the coarse hydraulic line if the pressure in the coarse hydraulic line falls below a threshold pressure.

\* \* \* \* \*